United States Patent

Smith et al.

[15] 3,697,865
[45] Oct. 10, 1972

[54] METHOD AND APPARATUS FOR TESTING ENGINES

[72] Inventors: Richard L. Smith, Garden City; Dennis F. Sauerbrey, Southfield, both of Mich.

[73] Assignee: Scans Associates, Inc., Livonia, Mich.

[22] Filed: Dec. 15, 1970

[21] Appl. No.: 98,475

Related U.S. Application Data

[63] Continuation of Ser. No. 862,604, Sept. 2, 1969.

[52] U.S. Cl. .................................324/16 R, 73/118
[51] Int. Cl. ....................................F02p 17/00
[58] Field of Search .........324/15, 16, 16 S, 16 T, 17; 73/116–118

[56] References Cited

UNITED STATES PATENTS

| | | | |
|---|---|---|---|
| 2,688,126 | 8/1954 | Weller | 324/15 |
| 2,884,113 | 4/1959 | Converse | 73/116 UX |
| 3,454,871 | 7/1969 | Nolting | 324/16 T |

FOREIGN PATENTS OR APPLICATIONS

| | | | |
|---|---|---|---|
| 670,792 | 9/1963 | Canada | 73/116 |

Primary Examiner—Michael J. Lynch
Attorney—Gregory S. Dolgorukov

[57] ABSTRACT

This application discloses a system or installation for testing automobile engines on a production basis to check or reveal the timing angle of each engine and to adjust said angle automatically in the process of the test to a predetermined standard or value. The application discloses further the instrumentation of a single test stand, adapted to perform such function, the manner in which a plurality of individual stands are combined with a conveyor automatically serving such stands to deliver the test engines to individual stands for tests, in the process of which tests a number of test operations are automatically performed in a predetermined sequence with the tested engines returned to the conveyor for delivery to the unloading stations. The application discloses further the manner in which a computer is combined with individual stands and with the conveyor to control the sequence of operations in individual stands and in the entire system to perform the predetermined tests as a part of production operations in an automobile plant.

3 Claims, 7 Drawing Figures

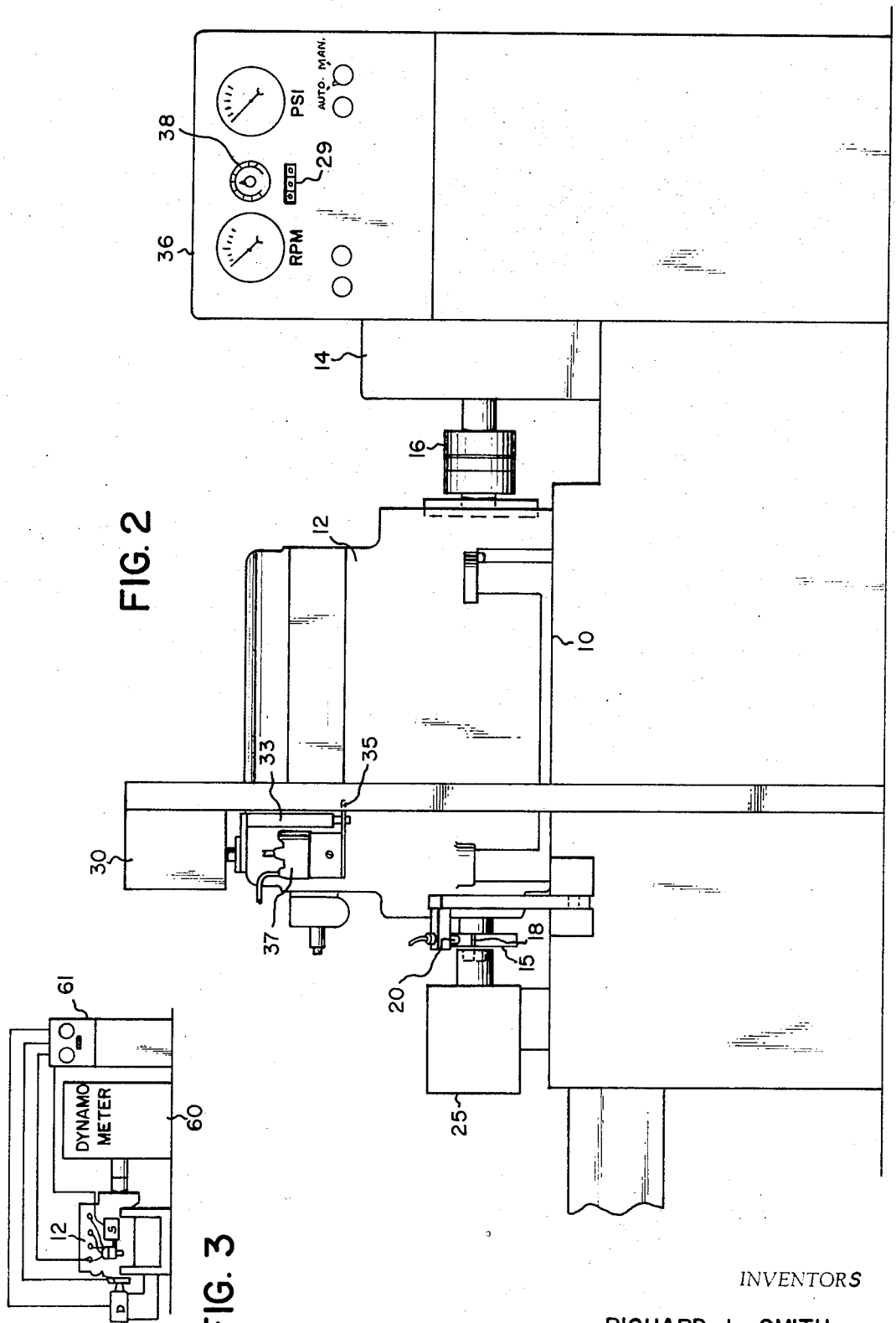

METHOD AND APPARATUS FOR TESTING ENGINES

The present application is a continuation of the application, Ser. No. 862,604, filed on Sept. 2, 1969 for Method and Apparatus for Testing Engines.

This invention relates to internal combustion engines, such as automobile engines, and more particularly to improved means for testing and adjusting the timing angle of the engine, i.e., the angle of occurrence of igniting spark in the cylinders of the engine with respect to the top dead center position of the pistons of the respective cylinders. In one of its aspects the invention relates to providing an improved automatic testing system including a conveyor serving one or more test stands each of them adapted to receive a test engine and to operate such engine in a manner to reveal the time of occurrence of the ignition spark with respect to the top dead center position of the engine piston, and to set and adjust such time usually referred to as "timing angle" at a predetermined or desired point.

Production of automobile engines includes several tests of each engine both in the partially completed state as well as in the virtually completed state, with the last type of test being of particular importance and involving many operations. Performance of the engine as a whole as well as of separate components and systems thereof, such as ignition system, carburation, cooling system, and the like, may be factory tested for the last time before the engine is assembled in a vehicle to go on the road. Accordingly such test must be quick and dependable.

One of the important tests is intended to check proper operation of the engine ignition system and particularly occurrence of ignition spark in each cylinder of the engine in proper time relation with respect to the moment when the piston reaches the top dead center position. It has been discovered rather early in the development of motor vehicles that ignition spark cannot produce proper release of energy if it occurs precisely at the moment when the piston in a particular cylinder reaches the end of its compression stroke i.e., its top dead center position. Because of extremely rapid reciprocations of the piston, which may reach 50 strokes per second and more, propogation of the flame in the combustion chamber takes appreciable portion of the time duration of the power stroke and, if the ignition spark occurs precisely at the time when the piston is at its top dead center and is just abut to begin on its power stroke, the piston can "run away from the pressure," interfering with the proper release of energy, causing its release as heat rather than work, in consequence whereof the engine does not develop its intended power and overheats. Accordingly, the engine ignition system is usually adapted to produce igniting spark while the piston is still finishing its compression stroke in order to permit the entire combustion charge to ignite and to develop substantially full pressure at the moment the piston starts on its power or working stroke. This is done by advancing the spark.

Relating reciprocal movements of the piston to the rotation of the engine crankshaft, this advance of the spark is expressed in degrees of rotation of the crankshaft. While in the past motor vehicle operator was expected to adjust this advance accordingly to his own feeling knowing only that for starting the engine the spark should be retarded and occur either at the top dead center position of the piston or slightly beyond it; the higher the seed of the engine, the higher should be the spark advance. In modern motor vehicles such constant readjustment of the spark advance is eliminated, and an automatic device is provided to advance the spark from its predetermined set value with increase of the engine speed.

However, because of manufacturing variations setting distributors in a uniform position does not assure occurrence of spark at the same timing angle in each one of a plurality of even identical engines, and testing each such engine to check the actual timing angle, produced thereby at a predetermined speed, is necessary. If the timing angle is different from a predetermined standard, it is necessary to adjust the distributor accordingly. different It is therefore important that the final test of engines at automobile plants includes checking of the timing angle actually produced by each engine at a certain predetermined speed, and the engine distributor of each engine is correctly set to produce the desired timing angle at that speed.

Production efficiency requires that such tests be performed in a safe and speedy manner and be accurate and dependable.

Heretofore such tests have been performed in individual stationary stands on which the engines were run either on gasoline or butane gas, and the timing angle was determined with the use of ignition timing light. Such testing requires cooling the engine, removal of exhaust gases and was connected with certain dangers. It was also slow, expensive, and not accurate.

One of the objects of the present invention is to provide an improved test stand adapted to receive and to operate a test engine to reveal its timing angle but without producing actual ignition in the cylinders thereof and thus eliminate the necessity of operating the engine on gasoline or on inflammable gases, such as butane gas, as well as eliminating the inconvenience and complications connected therewith.

Another object of the present invention is to provide an improved testing system for automobile engines, said system including a plurality of test stands receiving test engines from a loading station, to have each engine secure in a respective stand for the test, to run the engine in a manner to reveal correctly its timing angle, to adjust the timing angle automatically to its predetermined value, and to remove the test engine from the respective test stand and to deliver it to the unloading station.

A further object of the invention is to provide an improved engine test stand adapted to receive and to run the test engine to reveal its timing angle, all without requiring cooling the engine with water or removing exhaust gases.

A still further object of the invention is to provide an improved engine test stand adapted to receive a test engine, to set it in place, to run it to reveal its timing angle, to release its distributor fixing means, such as the distributor holdown bolt, to adjust the distributor to produce a predetermined timing angle, and thereupon to retighten said fixing means.

A still further object of the present invention is to provide an improved engine test stand of the foregoing character including a spark plug operated by the ignition system of the engine, as related to a selected cylinder, means to receive the impulse produced by the ignition spark, means producing pulses proceeding at uniform intervals, forming a predetermined part of a degree, from the moment of spark occurrence, magnetic means producing an impulse at the moment the piston of the selected cylinder reaches its top dead center position, means adapted to count the number of pulses that occurred from the time of occurrence of the spark and means stopping counting of said pulses at the moment the piston of said selected cylinder reaches its top dead center position.

A still further object of the present invention is to provide an improved engine test stand of the character specified in the preceding paragraph and adapted to produce a readable signal giving the number of pulses which occurred between the moment of occurrence of the ignition spark and the moment the respective piston reached its top dead center position.

A still further object of the present invention is to provide an improved engine testing stand adapted to test and to adjust the timing angle of the engine, with the read-out value of said angle and of adjustment being given in an accurate and precise manner, such as to one tenth of a degree.

A still further object of the present invention is to provide an improved engine test stand adapted to check and to adjust the timing angle of the test engine as determined by the engine distributor, means being provided to produce a read-out signal of said angle, with a servo-mechanism being provided to rotate the engine distributor and to advance or to retard automatically the ignition spark.

A still further object of the invention is to provide an improved engine test stand in which one signal used to indicate the timing angle is an electric pulse produced by a spark plug operated by the ignition system of the engine at the moment corresponding to that as required for the No. 1 cylinder, and the other signal is an electrical pulse produced by a magnetic pick-up at the moment the No. 1 cylinder piston reaches its top dead center position.

A still further object of the present invention is to produce an improved engine test system of the foregoing character, including a plurality of engine test stands, with the sequence of operations of individual stands and of the entire system being controlled by a computer device.

It is an added object of the present invention to provide an improved test system of the above nature which is relatively simple in construction, dependable in operation, is operated with a minimum of personnel and is relatively easy to repair and service.

Further objects and advantages of this invention will be apparent from the following description and appended claims, reference being had to the accompanying drawings forming a part of this specification, wherein like reference characters designate corresponding parts in the several views.

FIG. 2 is a diagramatic elevational view showing one separate test stand with a test engine operatively set therein for test, with an engine run by a suitable electric motor.

FIG. 3 is an elevational view showing a separate stand in which the test engine is operated under its own power and is loaded by a dynamometer.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Figure 1:
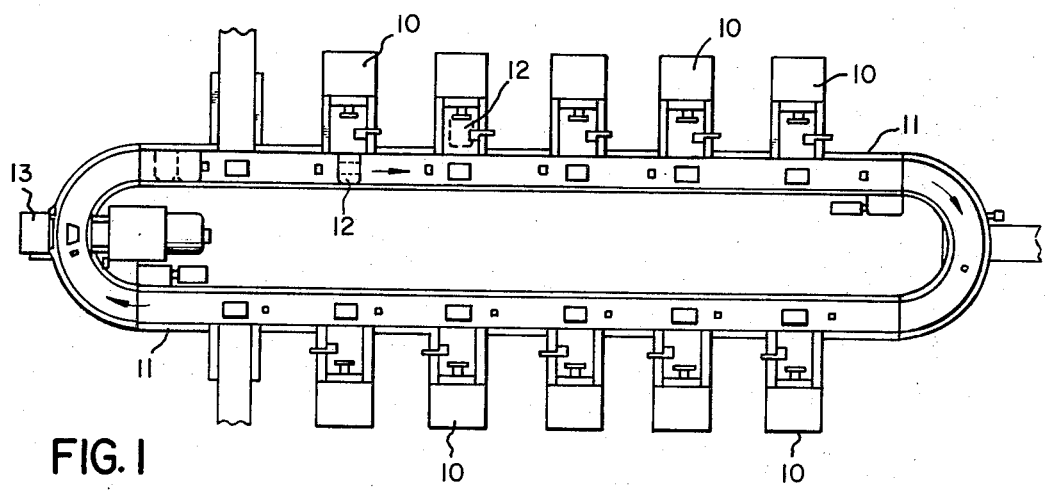
FIG. 1 is a diagramatic plan view showing a test system or installation including a plurality of test stands interconnected by a conveyor adapted to deliver test engines to each empty stand, to receive the tested engines from the respective stands after the test, and to deliver them to the unloading station.

In the drawings there is shown, by way of example, a number of test systems embodying the present invention. Referring specifically to FIG. 1, the same shows a test installation including a plurality of test stands designated by the numeral 10 interconnected with the aid of a conveyor II which may be such as those disclosed in the co-pending applications of V. G. Converse, III, et al. Ser. No. 707,033 filed on Feb. 21, 1968 for Accumulator Conveyor System, now U.S. Pat. No. 3,631,967 and Ser. No. 717,103 filed on Mar. 29, 1968 for Automatic System and Method, now U.S. Pat. No. 3,527,087. The conveyor II is adapted to serve such stands 10 by delivering the test engines, such as 12, from the loading station 13 to the respective stands. The stand which is empty would receive for test the first passing untested engine, and upon completion of the test return the tested engine to the conveyor for delivery to the station 13 for unloading. The tested engine would not be received by any other stands, even if the stand is empty.

The tests performed in each stand depend on the requirements set therefor, and the engines may be run on gasoline, butane gas, or may be operated by compressed air or by an electric of fluid (gas or liquid) motor. Use of compressed air or an electric of fluid motors insures maintenance of a predetermined speed and does not require cooling of the engine, although water may be used in the engine to perform leak tests such as to determined leakage from water cavity to atmosphere, or to combustion chamber and the crankcase. Oil pressure can also be conveniently checked in this test by being continuously monitored while the engine is running, with a view of stopping the engine should oil pressure fail. Visual check and audible check for noise can also be done. In accordance with the invention checking and adjusting of timing angle comprises one of the main tests performed in each stand.

FIG. 2 illustrates one test stand showing a test engine 12 received by the stand and operatively positioned therein to be driven with the aid of an electric motor 14, connected to the engine 12 by coupling 16.

On the front end of the crankshaft of the engine 12 there is operatively mounted a damper 15 provided in its periphery with slot or notch 18 related to the top dead center position of the piston of No. 1 cylinder. A magnetic pickup 20 is operatively installed in the stand in such a manner that when the piston of No. 1 cylinder is at its top dead center, the notch 18 cooperates with said magnetic pickup 20 in such a manner that an electric impulse is produced for the purposes explained in detail below.

Means are provided to have a similar impulse produced at the moment the spark plug of the same cylinder fires, which may be before or after the piston reaches the top dead center, to indicated an advanced spark or a retarded spark, respectively. The timing angle of the engine is thus revealed showing that the spark is either advanced or retarded. Measuring the angle by which the spark is advanced or retarded gives the value of the timing angle. Having the timing angle so ascertained provides the basis either to accept the same as corresponding to its predetermined value, or to adjust it to such value, if the timing angle differs from the prescribed value or standard.

Means adapted to measure the timing angle and to produce a signal related to the measured value are exemplified by the counting means which include an encoder 25 adapted to produce electric pulses of desired angular frequency such as 3,600 pulses per revolution or 10 pulses per degree. The encoder is drivingly connected to the engine and continuously produces electrical pulses at a fixed angular rate. Therefor, if the number of pulsations occuring between the spark and the upper dead center position of the piston is counted, the timing angle of the engine is thus ascertained.

This function, i.e., counting of the pulses within the interval between the moment of ignition and the top dead center position of the piston, is performed by an electronic counter 28 which is started by the signal from the high voltage probe 21 at the moment the spark plug 26 fires. The electronic counter 28 having started counting continues such counting until the piston reaches the top dead center in cases where the spark is advanced, or starting counting from top dead center to occurrence of spark, when the spark is retarded.

It will be understood that for convenience and in view of considerations such as programming of a computer which may be used to control the sequence of operations in a test stand it may be desirable to measure to a different point than the top dead center in order to have timing angle values of the same sign, irrespective of whether the spark is advanced or retarded.

Such a point may be anywhere past the top dead center for an angle larger than any practically occuring timing angle of a retarded spark. For instance, presuming that the spark is not expected to be retarded for more than 10°, such a point may be set at 12 past the top dead center. Now, the spark advanced for 7° would give the readout of 7°+12° or 19° i.e., 190 pulses, and a spark retarded, for instance for 6° would give the readout of 12°−6' or 6°, i.e., 60 pulses. Now, we can treat timing an engine before and after top dead center in a similar manner.

It should also be understood that the precise spot past the top dead center where the notch and the magnetic probe register may be determined by design consideration and may be in a place identified by somewhat unusual number such as 69°.

The timing angle so determined may appear on the digital readout 29 with desired precision. The next step of the operation of the device is to adjust the timing angle if the determined angle differs from the predetermined value. This may be done automatically and the value of the timing angle be preset. It should be understood that in such a case the appearance of the timing angle value on the readout is not necessary, and the timing angle will be automatically adjusted to the preset value by operation of the servo-mechanism 30 actuating the mechanical drive link 33, engage a distributor adjustment lever 35 provided at the distributor 37 to produce the correct timing angle as preset by the operator on the selector 38.

Figure 6:
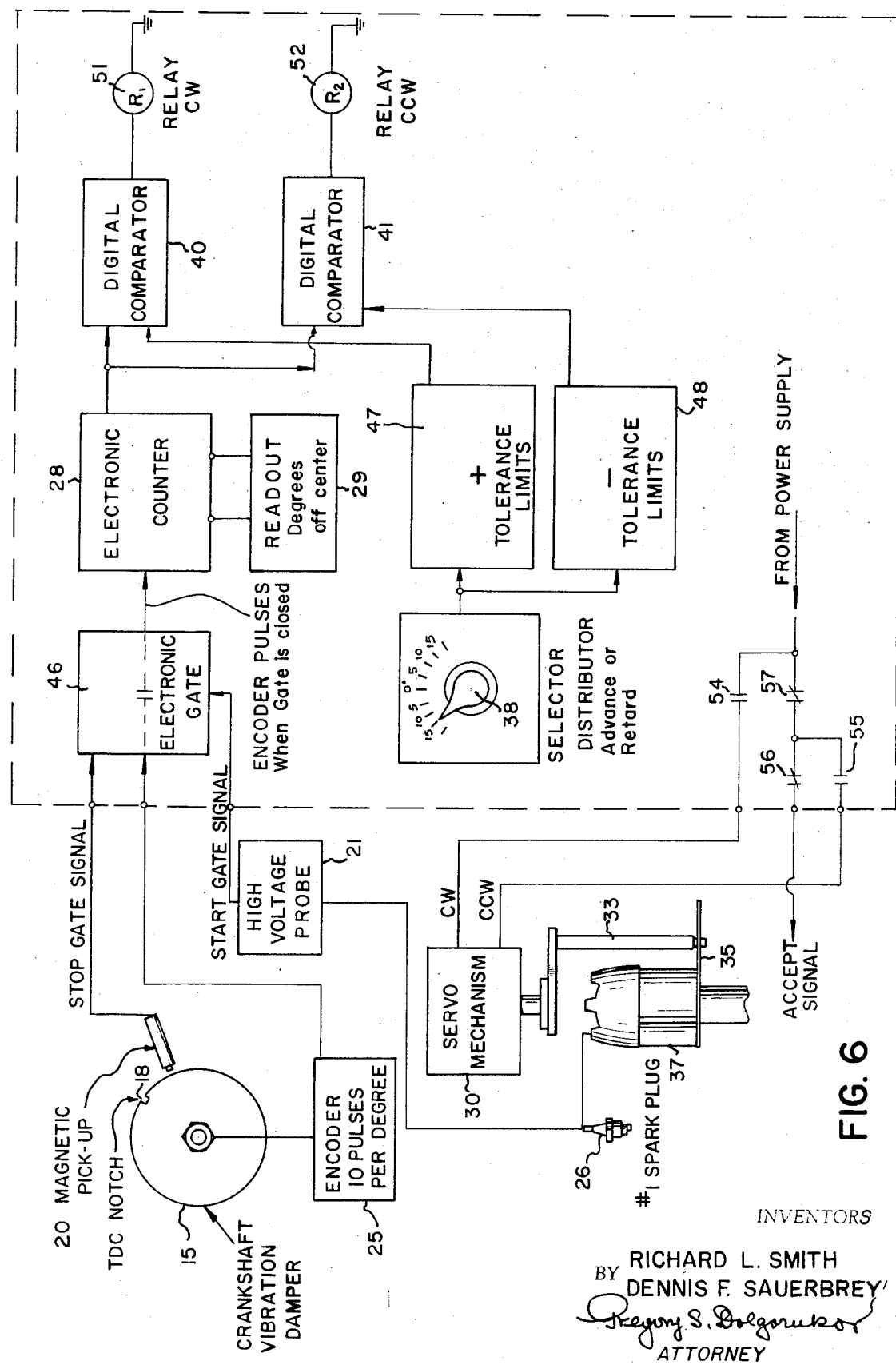
FIG. 6 is a diagramatic or schematic view similar in part to FIG. 5 but showing included therein necessary electronic components to digitally compare or set timing angle.
Figure 7:
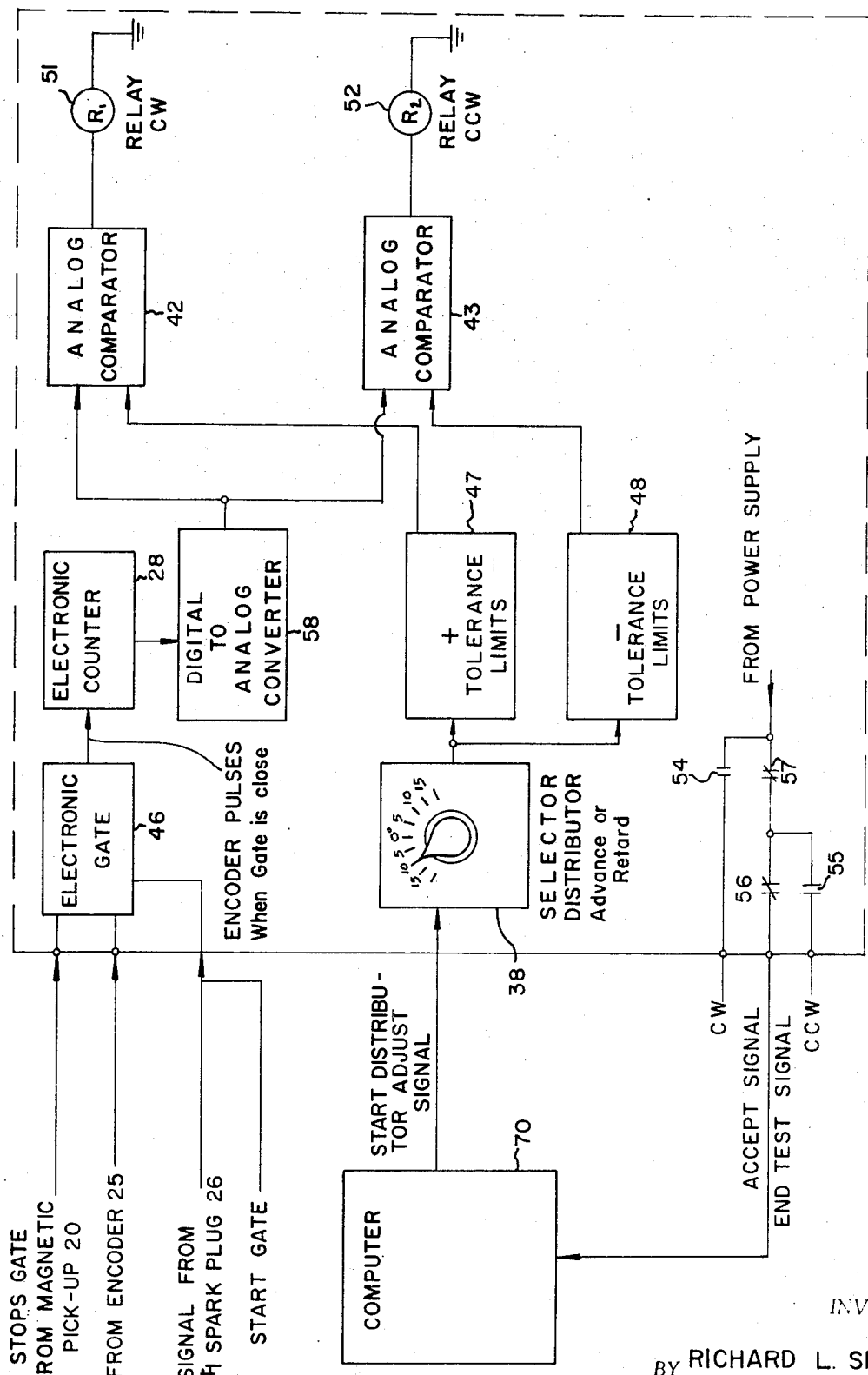
FIG. 7 is a diagramatic or schematic view similar in part to FIG. 6 but showing only the electronic instrumentation or control panel containing the electronic instrumentation, and with the analog comparators substituted for digital comparators.

The electronic comparators, which may be either of the digital type, as are the comparators 40 and 41 in FIG. 6, or be of the analog type as are comparators 42 and 43 of FIG. 7, are devices well known in the art, and need not be described in detail. Such comparators have the ability to compare the actual timing angle from the electronic counter 28 and the preset angle from the selector switch 38 and give an output signal capable of driving the servo-mechanism 30 to operate the distributor drive linkage described above until the preset timing angle is achieved. It should be understood that the distributor hold-down bolt is automatically loosened at the beginning of the test and is retightened after the preset timing angle is achieved.

It should be understood that for producing spark for the above-described purposes the spark plug need not be located within the engine cylinder but may operatively arranged anywhere in the test stand as long as it is properly grounded and is connected to the distributor to receive electric impulses directed to it by the distributor. The spark plug installed in the test stand in such a manner is sometimes called a "captive spark plug." As far as providing electric energy to produce high tension current managed by the distributor for ignition purposes, such energy may be produced by providing a conventional automobile ignition system including a battery, a primary coil, an interrupter device, and a secondary coil such as indicated herein by the numeral 44. Also, a high tension power supply may be connected to the distributor.

As mentioned before, FIG. 6 includes the instrumentation required in addition to that required to digitally compare or set timing angle. Such additional electronic components include the electronic gate 46 which is a device in the nature of an electronic switch, and is an electronic start and stop device intended to allow the pulses from the encoder 25 to be received by the electronic counter 28. It is started by the high voltage probe 21 and stopped by the magnetic pickup 20. The electronic counter 28 totalizes the encoder pulses and transmits the accumulated total to the preset positive and negative tolerance limits, 47 and 48, respectively, as set on the selector switch 38 by the operator or automatically.

The digital comparators 40 and 41 in turn will energize one of two relays 51 or 52 if the timing angle is incorrect, i.e., is outside the tolerance limits. The energized relay will close corresponding relay contacts 54 or 55 to actuate the servo-mechanism 30 continuously in the correct mode, clockwise or counterclockwise, until the preset timing angle is achieved as indicated by an accept signal obtained through the unactuated relay contacts 56 and 57 when both relays 51 and 52 are not energized. FIG. 6 also indicates the electric power supply necessary to drive the servo-mechanism 30.

In the construction shown in FIG. 7, the electronic counter 28 totalizes the encodes pulses and transmits the accumulated totals to the digital-to-analog converter 58 which converts the accumulated total into an analog voltage signal and transmits such signal to the analog comparators 42 and 43. These analog comparators compare this analog voltage signal to the preset positive and negative tolerance limits 47 and 48, respectively. The analog comparators 42 and 43, in turn, will energize one of two relays, as in FIG. 6, if the timing angle is incorrect. The electronic components illustrated and described above with respect to their functions, are commercial devices and their detailed description is not believed necessary for the purposes of understanding the invention.

FIG. 3 shows an installation in which a power test may also be performed on the engine. For such purpose the engine may be operated under its own power with the use of gasoline or butane gas as fuel and loaded with a dynamometer such as designated by the numeral 60.

The control panel 61 of this construction may be similar or identical to the control panel 36 of the construction illustrated in FIG. 2. Other details of this construction and its operation may be similar to those described above and need not be repeated here.

Figure 4:
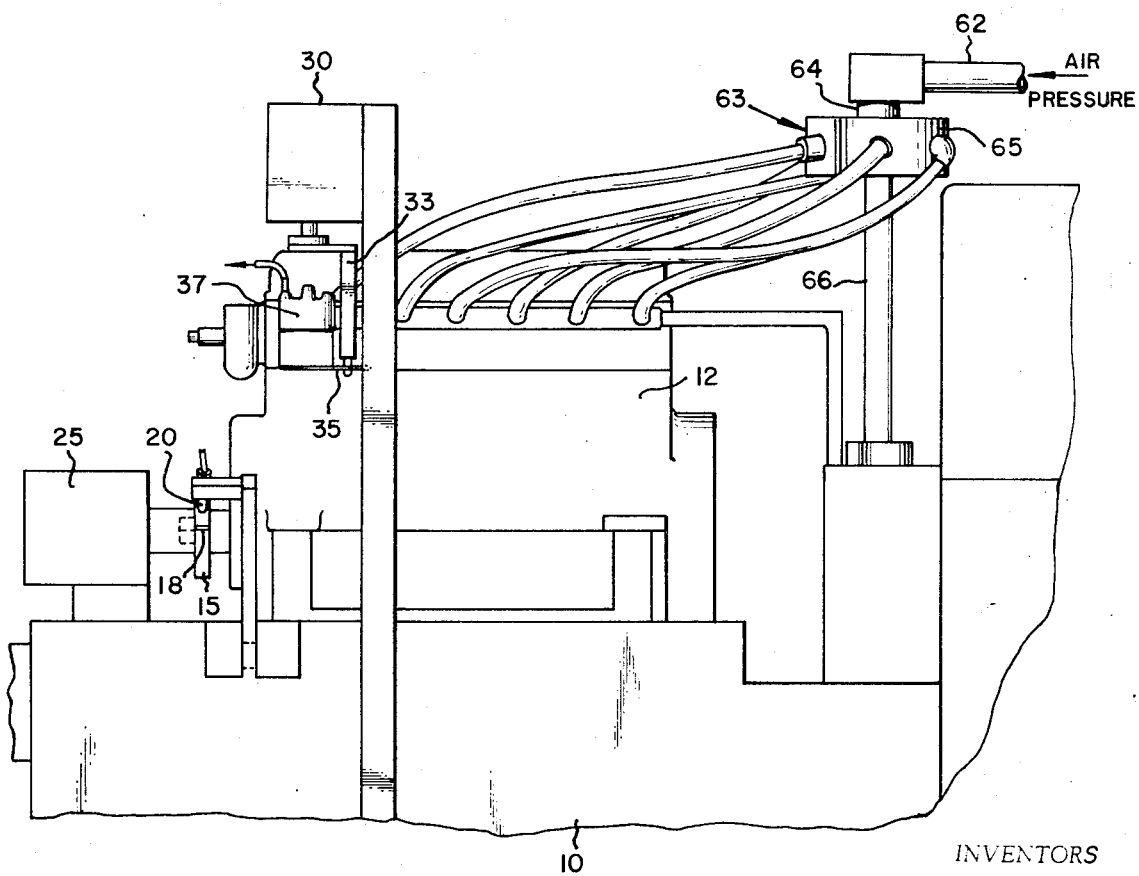
FIG. 4 is an elevational view similar in part to FIG. 2 and showing a construction providing for driving the test engine with compressed air, or other fluid.
Figure 5:
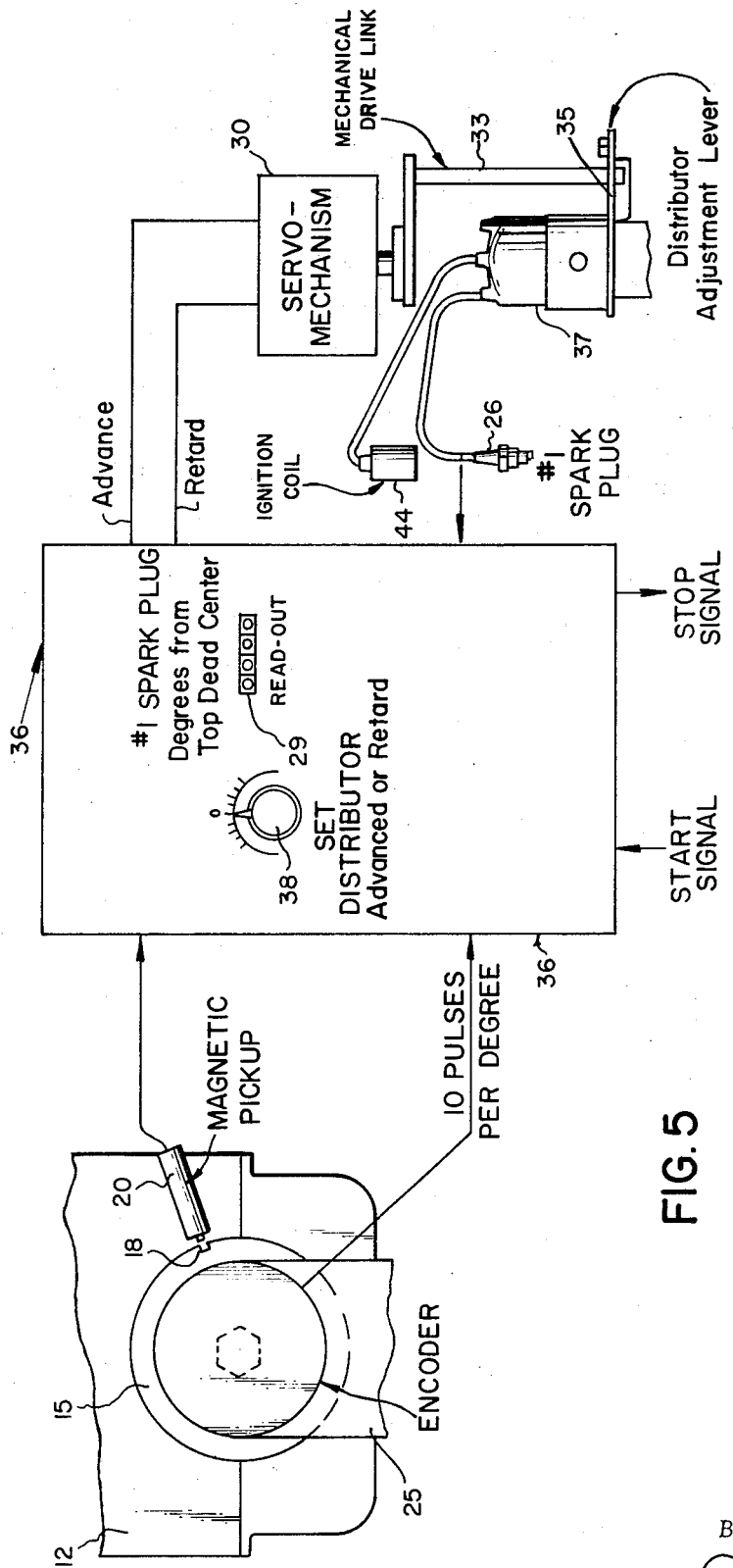
FIG. 5 is a diagramatic view showing instrumentation and components necessary for conducting a test on one engine such as may be set in a single test stand.

FIG. 4 is a view similar in part to FIG. 2, and illustrating a test stand including provisions for running the test engine 12 with compressed air. For such purpose a conduit 62 supplies air under suitable pressure from a source of compressed air to a pneumatic distributor of rotatable valve 63 having an inner rotatable head 64 receiving the air from the conduit 62 and directing it in a predetermined order into the air hoses having upper ends connected to the stationary housing 65, and the lower ends connected to the engine 12 at the spark plug holes. The shaft 66 drives the head 64 from a suitable pneumatic or electric motor. Such a construction has a number of advantages already mentioned.

In accordance with the invention, the sequence of the above mentioned operations in each individual stand as well as in entire test system may be controlled with the aid of computer such as one designated by the numeral 70. As shown in FIG. 7, the computer 70 will initiate the start of the test for the adjustment of the timing angle. The computer 70 enables the electronic gate 46 to transmit encoder pulses for totalization by the electronic counter 28. The computer 70 will maintain a test condition until the proper timing angle is achieved as indicated by an accept signal from the digital or analog comparators and corresponding relays.

If desired and economically feasible, the computer 70 can also be connected to perform the functions of the electronic gate 46, the electronic counter 28, the analog or digital comparators and the appropriate relays such as 51 and 52. The computer 70 can also set the tolerance limits 47 and 48 to which the distributor is to be adjusted. The computer can also supply the necessary signals to enable the servo-mechanism 30 to properly adjust the distributor 37.

In general, the computer may be adapted to control the control panel of the system or of several of them, which may be the case in a plant the production of which justifies installation of several test systems.

In making a desired selection of components for performance of the functions as described above, it should be understood that the computer is a relatively large and expensive machine capable of performing and controlling a large variety of functions. If a computer is available, a substantial number of the components described above may be eliminated and their respective functions delegated to the computer to utilize it more efficiently. Tests other than those mentioned herein, such as obtaining variables data, such as of oil pressure, timing angle and degree of leakage and the like, may also be controlled by a computer. However, in more modest installations where acquiring a computer is not economically feasible, the above disclosed system can operate with the combinations of components as described above.

While the timing angle of an engine is related to the speed of the engine, as mentioned before, it should be clearly understood that the system disclosed herein can reveal and adjust the timing angle of an engine to its desired standard or value irrespective of the speed of the engine. This is an important advantage over the prior art, and it is due to the fact of the system having the encoder drivingly connectable to the engine crankshaft and rotating therewith, and therefore responding to the variations of the engine speed.

There is thus provided an improved testing system and a stand therefor whereby the objects of the invention listed above and numerous additional advantages are attained.

We claim:

1. A production testing system for revealing and adjustably setting the ignition timing angle of internal combustion engines as they are produced in an automobile plant, said system comprising a conveyor having a plurality of stands each adapted, when unoccupied, to receive from said conveyor an untested engine, means in said stand to run said engine without any structural modifications, with said engine including one selected cylinder having a spark plug connected therewith, a distributor impressing electric potential on said spark plug, a crankshaft and a piston drivingly connected to said crankshaft and operating within said selected cylinder, each of said stands including an encoder adapted to produce electric pulses at predetermined and uniform angular intervals, a damper having in its periphery a slot related to the top dead center of the selected cylinder, a magnetic pick up operatively installed in the stand and adapted to cooperate with said slot to produce an electric impulse when the piston of the selected cylinder reaches its top dead center, an electronic counter adapted to count said pulses repeatedly in the period of time between firing of the spark plug of the selected cylinder and the moment of the piston thereof reaching its top dead center, and means in said stand adapted to unlock the engine distributor and to rotate the same in the direction to bring the count of pulses to the predetermined number and thus to adjust the timing angle of the test engine to the predetermined value, and to lock the distributor after adjustment.

2. A production testing system for revealing and adjustably setting the ignition timing angle of internal combustion engines as they are produced in an automobile plant, said system comprising a conveyor having a plurality of stands each adapted, when unoccupied, to receive from said conveyor an untested engine, means in said stand to run said engine without any structural modifications, with said engine including one selected cylinder having a spark plug connected therewith, a distributor impressing electric potential on said spark plug, a crankshaft and a piston drivingly connected to said crankshaft and operating within said selected cylinder, each of said stands including an encoder adapted to produce electric pulses at predetermined and uniform angular intervals, a damper having in its periphery a slot related to the top dead center of the selected cylinder, a magnetic pick up operatively installed in the stand and adapted to cooperate with said slot to produce an electric impulse when the piston of the selected cylinder reaches its top dead center, an electronic counter adapted to count said pulses repeatedly in the period of time between firing of the spark plug of the selected cylinder and the moment of the piston thereof reaching its top dead center, means in said stand adapted to unlock the engine distributor and to rotate the same in the direction to bring the count of pulses to the predetermined number and thus to adjust the timing angle of the test engine to the predetermined value and to lock the distributor after adjustment, setting means defining two range limits of set values which are applied to two comparators connected to the counter and by a relay connected to each comparator controlling the rotation of the distributor in one or the other direction, and a conveyor for receiving and transporting engines to be tested to a vacant stand and for further delivering the tested engines at a discharge station.

3. A production testing system for revealing and adjustably setting the ignition timing angle of internal combustion engines as they are produced in an automobile plant, said system comprising a conveyor having a plurality of stands each adapted, when unoccupied, to receive from said conveyor an untested engine, means in said stand to run said engine without any structural modifications, with said engine including one selected cylinder having a spark plug connected therewith, a distributor impressing electric potential on said spark plug, a crankshaft and a piston drivingly connected to said crankshaft and operating within said selected cylinder, each of said stands including an encoder adapted to produce electric pulses at predetermined and uniform angular intervals, a damper having in its periphery a slot related to the top dead center of the selected cylinder, a magnetic pick up operatively installed in the stand and adapted to cooperate with said slot to produce an electric impulse when the piston of the selected cylinder reaches its top dead center, an electronic counter adapted to count said pulses repeatedly in the period of time between firing of the spark plug of the selected cylinder and the moment of the piston thereof reaching its top dead center, an electronic counter adapted to count said pulses repeatedly in the period of time between firing of the spark plug of the selected cylinder and the moment of the piston thereof reaching its top dead center, means in said stand adapted to unlock the engine distributor and to rotate the same in the direction to bring the count of pulses to the predetermined number and thus to adjust the timing angle of the test engine to the predetermined value and to lock the distributor after adjustment, setting means defining two range limits of set values which are applied to two comparators connected to the counter and by a relay connected to each comparator for controlling the rotation of the distributor in one or the other direction, and a computer controlling the electrical and electronical components of the system thereby adjusting the operational sequence at various test stands, as well as in the whole system.

* * * * *

UNITED STATES PATENT AND TRADEMARK OFFICE
CERTIFICATE OF CORRECTION

PATENT NO. : 3,697,865
DATED : October 10, 1972
INVENTOR(S) : Richard L. Smith and Dennis F. Sauerbrey It is certified that error appears in the above-identified patent and that said Letters Patent are hereby corrected as shown below:

In column 10, line 27, cancel beginning with "an elec-" to and including "top dead center," in column 10, line 31.

Signed and Sealed this twenty-ninth Day of June 1976

[SEAL]

Attest:

RUTH C. MASON
*Attesting Officer*

C. MARSHALL DANN
*Commissioner of Patents and Trademarks*